United States Patent [19]

Burr et al.

[11] Patent Number: 4,696,156
[45] Date of Patent: Sep. 29, 1987

[54] FUEL AND OIL HEAT MANAGEMENT SYSTEM FOR A GAS TURBINE ENGINE

[75] Inventors: Donald N. Burr, Glastonbury; Paul S. Danilowicz, Manchester; Thomas C. Franz; Thomas P. Mortimer, both of Bolton; Edward B. Pero, Somers, all of Conn.

[73] Assignee: United Technologies Corporation, Hartford, Conn.

[21] Appl. No.: 870,192

[22] Filed: Jun. 3, 1986

[51] Int. Cl.$^4$ .......................... F02C 7/06; F02C 7/224
[52] U.S. Cl. ...................................... 60/39.08; 60/736
[58] Field of Search ................. 60/39.02, 39.08, 39.83, 60/736; 184/6.11

[56] References Cited

U.S. PATENT DOCUMENTS

| | | |
|---|---|---|
| 3,300,965 | 1/1967 | Sherlaw et al. ..................... 60/39.08 |
| 3,382,672 | 5/1968 | French ............................. 60/39.281 |
| 3,779,007 | 12/1973 | Lavash ............................ 60/39.281 |
| 4,020,632 | 5/1977 | Coffinberry et al. ............. 60/39.03 |
| 4,104,873 | 8/1978 | Coffinberry ........................ 60/39.08 |
| 4,151,710 | 5/1979 | Griffin et al. ...................... 60/39.08 |
| 4,354,345 | 10/1982 | Dreisbach et al. ................ 60/39.08 |

Primary Examiner—Louis J. Casaregola
Attorney, Agent, or Firm—Troxell K. Snyder

[57] ABSTRACT

A heat management system is provided for a gas turbine engine (10) having first and second oil cooling loops (14, 16). The system distributes excess fuel flow from a main fuel pump (44) among a plurality of upstream locations (58, 60, 68) for managing the transfer of heat between the oil loops (14, 16) and the flowing fuel. A diverter valve (62) regulates the distribution of the bypass fuel responsive to engine heat generation, oil temperature, and/or fuel temperature. A passive fuel distribution configuration using one or more fuel flow restrictors (72, 74, 76) is also disclosed.

7 Claims, 2 Drawing Figures

FUEL AND OIL HEAT MANAGEMENT SYSTEM FOR A GAS TURBINE ENGINE

FIELD OF THE INVENTION

The present invention relates to a system for transferring heat energy between the fuel and lubricating oil of a gas turbine engine or the like.

BACKGROUND

The cooling requirements of gas turbine engines are well known to the designers of today's high performance aircraft powerplants. Certain internal structures, such as bearings, are both cooled and lubricated by a circulating flow of oil which is distributed and collected throughout the main engine structure, returning to a central collection point after having absorbed significant heat energy. Another source of heat is the accessory drive system coupled to the main engine by a mechanical drive and clutch system. Such accessory drives, for example a constant speed drive for the aircraft service electrical generator, are also provided with an independent circulating flow of oil for lubricating and cooling purposes.

One method of cooling the circulating oil loops described above is through the use of air-oil coolers and a flow of relatively cool compressor bleed air. Such coolers, while effective, diminish the overall engine operating efficiency since the extraction of bleed air increases overall engine power demand for a given level of useful thrust. This power penalty results in an increase in engine thrust specific fuel consumption.

Another method, often used in conjunction with air cooling, is to reject heat from the circulating oil loops into the flow of fuel entering the engine combustion chamber. This method uses the fuel flow as a convenient, recuperative heat sink and incurs few of the penalties of air cooling, but is limited in effectiveness by the maximum temperature tolerable by the fuel.

In order to appreciate the design problems associated with the management of heat generated in these systems, a brief discussion of the function and heat output of each is required. Cooling oil circulating through the main engine lubrication system receives heat energy at a rate related to the product of engine rotor speed and power output. The cooling needs of the main engine lubrication loop are thus at a minimum during periods of low power operation, such as idling, and at a maximum during high or full power operation, such as take-off. Normal engine operation under cruise conditions would fall between the two ranges but closer to the higher power conditions.

The lubricating and cooling oil of the accessory drive, and particularly for an accessory drive provided for the airframe electrical generator, does not receive heat energy proportional to the engine speed and power level but rather as a function of the electrical demand of the airframe. The accessory drive's maximum heat rejection demand may therefore occur at nearly any time in the operation of the aircraft, depending on the number of ovens, coffee makers, reading lamps, electrical heaters, or other power consuming devices switched on in the airframe at any particular time. The accessory heat rejection demand also varies less overall than that of the engine lubrication system, with the minimum heat rate being about one-half of the maximum heat rejection rate.

Against the heat production of the main engine lubrication system and the accessory drive, the needs of the fuel stream must also be considered and balanced. It is typical in gas turbine engine installations to deliver the fuel to the engine combustor by a positive displacement pump connected mechanically to the rotating engine shaft. It will be appreciated by those skilled in the art that a positive displacement pump, such as a gear pump or the like, delivers a volumetric flow rate directly proportional to the speed of the pump. As the flow rate from a pump turning proportional to engine shaft speed could never be made to match the fuel flow requirements of an aircraft gas turbine engine operating under a variety of power level demands and environmental conditions, it is common in the industry to size the positive displacement main fuel pump with an excess flow capacity under all engine operating conditions. The fuel system thus must include a fuel control valve and a bypass or return fuel line for routing the excess main fuel pump output back to the low pressure side of the pump.

The use of a pump bypass, common in many fluid flow applications, normally does not impact the operation of the fuel supply subsystem in an aircraft application. Under certain operating conditions, however, such as engine idling either in flight or on the ground, it will be nonetheless apparent that the amount of fresh fuel entering the fuel system is small while the relative volume of fuel being bypassed back to the pump inlet is quite large. The combination of pump inefficiency and recirculation of the excess main fuel pump output through the bypass line can heat the circulating fuel to an undesirably high temperature making it necessary to provide at least temporary cooling to the fuel supply system for idle operation.

Various methods have been proposed in the art for accommodating the widely varying needs of the fuel supply system, main engine lubrication system, and the accessory drive unit. U.S. Pat. No. 4,151,710 "Lubrication Cooling System for Aircraft Engine Accessory" issued May 1, 1979 to Griffin et al, shows disposing the accessory drive fuel-oil heat exchanger downstream with respect to the engine fuel-oil heat exchanger in the fuel supply line. The circulating accessory oil is routed through or around the accessory fuel-oil heat exchanger and an air-oil cooler in order to manage the accessory drive heat rejection. The reference also discloses removing heat energy from the fuel stream during periods of excessive fuel temperature, such as during ground idle. The total fuel flow passes through both the engine lubrication system fuel-oil cooler and the accessory drive fuel-oil cooler Such prior art systems, while effective, lack the flexibility for efficiently accommodating the wide variations in heat generation occurring in the various systems described. In the subject reference, for example, by sizing the accessory fuel-oil cooler to accommodate the maximum mass flow of fuel in the fuel supply line, it is necessary to increase the size of the accessory fuel-oil heat exchanger so as to accommodate the higher fuel throughput. Additionally, by placing the accessory drive heat exchanger downstream of the engine lubrication system fuel-oil heat exchanger, the referenced arrangement limits the fuel cooling available to the accessory drive unit, requiring additional air-oil cooling capacity to achieve current stringent accessory drive oil temperature requirements.

SUMMARY OF THE INVENTION

It is an object of the present invention to provide a system for transferring heat energy generated in a gas turbine engine among a first oil loop for cooling an engine accessory drive, a second oil loop for cooling and lubricating the engine bearings and other internal structures, and the fuel stream supplied to the engine for combustion therein.

It is further an object of the present invention to distribute said heat energy responsive to the current rate of heat generation occurring within the accessory drive, engine, and fuel stream for achieving efficient and reliable operation over the engine power output range.

It is further an object of the present invention to provide a heat transfer system able to cool the fuel stream by one or more oil loops during low power engine operation, and to cool the oil loops with the fuel stream during high power engine operation.

It is still further an object of the present invention to accomplish the distribution of heat energy by directing a bypass flow of fuel among a plurality of return locations in the fuel stream responsive to the desired heat transfer performance.

According to the present invention, heat is transferred between each oil loop and a flowing fuel stream by a pair of fuel-oil heat exchangers receiving the fuel stream in series. The fuel stream passing through the fuel-oil heat exchangers includes at least a portion of the fuel supplied from the aircraft fuel tank by a boost pump at a metered rate equal to that currently being delivered to the gas turbine engine combustor.

The fuel stream enters a main fuel pump operating at a fuel flow rate in excess of the metered rate, hence requiring a portion of the fuel flowing therefrom to be returned to the fuel stream prior to the main fuel pump. This diversion of the main pump outlet flow is accomplished by a fuel controller which determines the metered fuel flow rate responsive to the demanded engine power level.

According to the present invention, a bypass conduit having at least two branches is provided for returning the bypass flow to two or more locations in the stream flowing to the main fuel pump, thus altering the fuel flow rate and effectiveness of one or both of the fuel-oil heat exchangers.

The bypass fuel is allocated among the return locations responsive to the engine power level. Specifically, one embodiment of a system according to the present invention returns the bypass fuel to first and second locations disposed respectively upstream of the first loop fuel-oil heat exchanger and intermediate the first and second loop fuel-oil heat exchangers. Allocation of the bypass fuel flow between the first and second locations is accomplished by a diverter valve manipulated responsive to the engine power level.

A second embodiment according to the present invention returns the bypass fuel flow to first and third locations disposed respectively upstream of the first loop fuel-oil cooler and downstream of the second fuel-oil cooler prior to the main fuel pump. Allocation of the bypass fuel between the first and third locations is accomplished passively by the effect of one or more flow restrictors placed in the bypass return line. It is an additional feature of this second embodiment that the fresh metered fuel entering the system from the boost pump may bypass the fuel-oil heat exchangers at high metered fuel flow rates reducing the total fuel pressure drop between the boost pump and the main fuel pump.

The present invention thus optimally matches fluid temperatures and heat exchange rates between the fuel supplied to the engine and the oil loops under all engine operating conditions, thereby reducing the requirement for auxiliary oil cooling with compressed engine air or the like. The invention further provides, for those situations wherein the rate of heat buildup in the fuel stream is excessive due to a high bypass flow as compared to the metered flow, a means for cooling the recirculating fuel through a reverse transfer of heat energy from the fuel into the circulating oil loops.

Still another advantage of the allocating function according to the present invention is a reduction in the maximum rate of fuel flowing through an individual fuel-oil heat exchanger relative to the minimum rate, thus reducing exchanger size while providing sufficient heat transfer capacity under all cooling conditions. Both these and other advantages will be apparent to those skilled in the art upon careful inspection of the following description and the appended claims and drawing figures.

DETAILED DESCRIPTION OF THE PREFERRED AND ALTERNATIVE EMBODIMENTS

Figure 1:
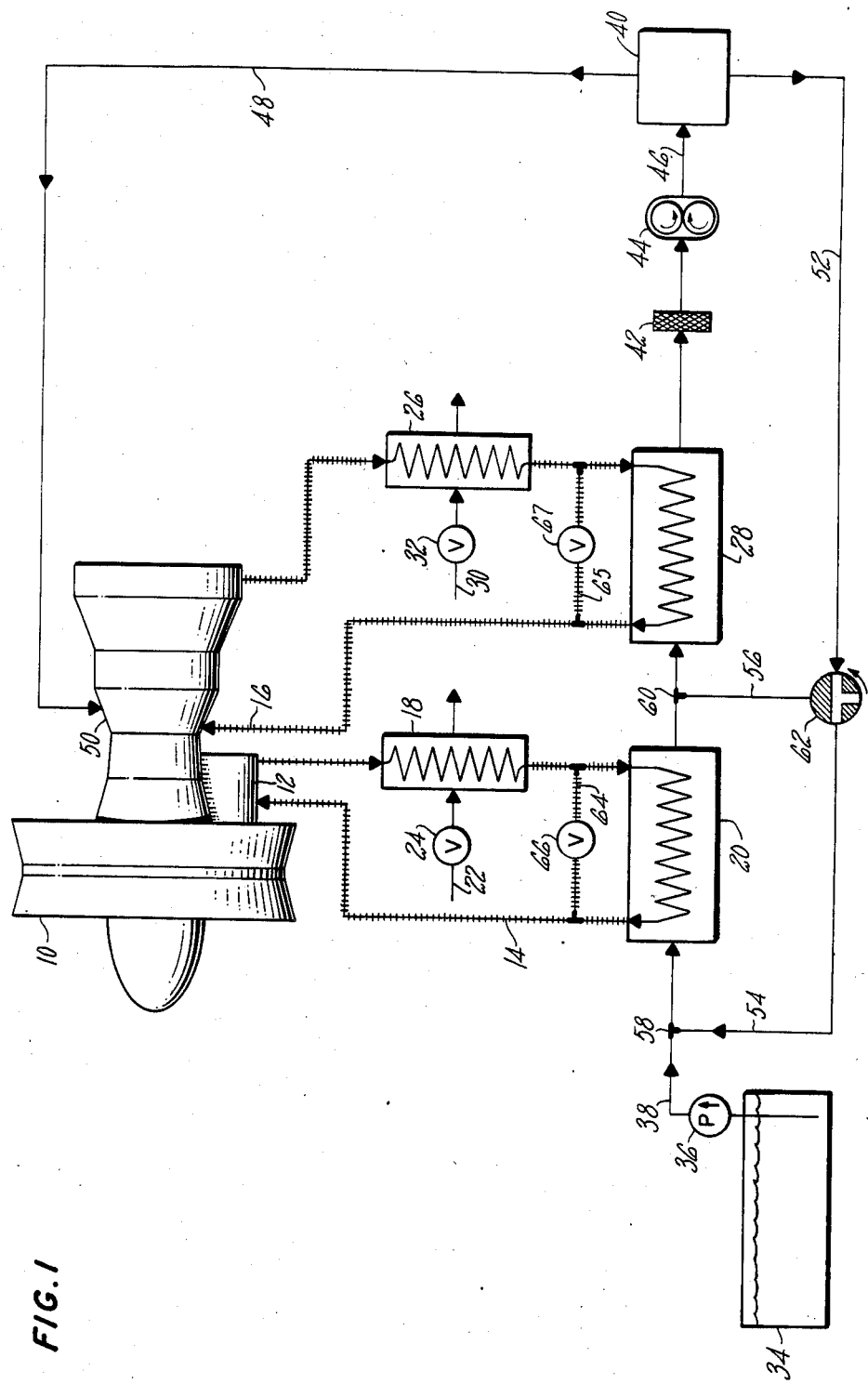
FIG. 1 shows a flow schematic of a first embodiment of a fuel and oil heat management system according to the present invention.

FIG. 1 shows a schematic representation of the fuel and oil flow systems for a gas turbine engine 10. An accessory drive 12 is mechanically linked (not shown) to the engine 10 and is cooled by a first oil loop 14 wherein oil flowing from the accessory drive 12 passes in sequence through a first air-oil cooler 18 and a first fuel-oil heat exchanger 20 before being returned to the accessory drive unit 12. Cooling air 22, extracted from the compressor or fan section of the engine 10, passes through the air-oil cooler 18 and is regulated by a first air control valve 24.

Lubricating and cooling oil for the main engine bearings and other internal components circulates in a wholly separate oil loop 16, passing in sequence through a second air-oil cooler 26 and a second fuel-oil heat exchanger 28 before returning to the engine 10. Cooling air 30 for the second air-oil cooler 26 is also extracted from the engine fan or compressor and is regulated by a second air control valve 32.

Combustion fuel is supplied to the engine from the main fuel tank 34 by a fuel system including an engine driven boost pump 36. Boost pumps are typically centrifugal pumps designed to operate at an essentially constant pressure for a given engine speed, independent of the volumetric flow rate of fuel therethrough. Boost pump 36 supplies fuel to a fuel conduit 38 at a flow rate equivalent to the current fuel demand of the gas turbine engine 10. This flow rate, termed the "metered fuel flow rate", is determined by the main engine fuel control 40 as discussed hereinbelow.

The metered fuel flow enters the first fuel oil heat exchanger 20, passing therethrough and flowing subsequently through the second fuel-oil exchanger 28, a fuel filter 42, and a positive displacement main fuel pump 44, finally entering the fuel controller 40. It should be noted that the main fuel pump 44 is driven by the engine 10 and thus has a pump speed proportional to the engine speed.

As discussed in the preceding section, the main fuel pump 44 develops a volumetric flow rate dependent upon the pump shaft speed and is therefore sized to provide a fuel flow at the pump outlet 46 in excess of the metered fuel flow rate. The fuel controller 40 accepts the fuel from the pump outlet 46 and divides the flow stream between a supply line 48 which is routed to the combustion section 50 of the gas turbine engine 10, and a bypass line 52. The fuel flow rate in the supply line 48 is the metered fuel flow rate as determined by the fuel controller 40 while the fuel flow in the bypass line 52 is equal to the excess main pump fuel delivery.

In this first embodiment of the present invention, the bypass line 52 includes two branches, a first branch 54 and a second branch 56 together providing a means for returning and distributing the bypass flow between two return locations 58, 60, respectively. The first and second return locations 58, 60 are disposed respectively upstream of the first fuel-oil heat exchanger 20, and intermediate the first and second fuel-oil heat exchangers 20, 28. The flow of bypass fuel is allocated between the locations 58, 60 by a diverter valve 62 operable between a first position wherein the entire flow of bypass fuel in the bypass line 52 is directed to the first return location 58, and a second position (not shown) wherein the entire bypass fuel flow is directed to the second location 60. It should be noted at this time that although the diverter valve 62 is disclosed as operating in an either/or fashion for diverting the entire bypass fuel stream, it may be useful under some circumstances to employ a partial diverter valve operable for dividing the bypass fuel between the first and second branches 54, 56 in a proportional manner.

It is preferable to operate the diverter valve 62 responsive to an engine operating parameter related to the rate of heat rejection to the oil loops 14, 16. One such parameter is the fuel pressure rise across the engine driven boost pump 36 which is related to engine speed.

In operation, fuel and oil flow in the above-described systems with heat exchange therebetween accomplished in the fuel-oil heat exchangers 20, 28. Under conditions of low engine power, such as idling either on the ground or in flight, the metered fuel flow rate is relatively low, matching the fuel demand of the engine 10. As the engine shaft speed at idle is also relatively low as compared to cruise or full power levels, the output of the positive displacement main fuel pump 44, although much greater than the metered fuel flow rate, is also reduced. The diverter valve 62 is positioned during these periods to direct the entire bypass fuel flow to the first return location 58 through the first return branch 54. In this configuration, the entire bypass fuel flow and metered fuel flow pass sequentially through the first and second fuel-oil heat exchangers 20, 28.

During extended periods of idling resulting in excessive heat buildup in the recirculating fuel, the first fuel-oil heat exchanger 20 acts to remove heat from the fuel by transferring heat in the reverse direction into the first oil loop 14. This heat is removed from the loop 14 by opening the valve 24 to admit a flow of cooling air 22 through the first air-oil cooler 18. Similarly, during periods of inflight engine shutdown, heat removed from the windmilling engine, accessory drive, and recirculating fuel is rejected from the system through the air-oil coolers 18, 26.

During periods of full power or cruise engine operation, the diverter valve 62 is moved to the second position wherein the entire flow of bypass fuel is returned to the second return location 60 through the branch 56. In this configuration, the fresh supply of fuel from the fuel tank 34 forms the entire fuel flow through the first fuel-oil heat exchanger 20 wherein the fuel absorbs heat from the circulating oil in the first loop 14. The second fuel-oil heat exchanger 28 receives both the bypass fuel returned by the controller 40 as well as the fuel flowing from the first fuel-oil heat exchanger 20. This combined fuel flow passes through the second fuel-oil heat exchanger 28, cooling the oil circulating in the second oil loop 16, and passing subsequently through the filter 42 and main fuel pump 44.

It will be appreciated that during operation at these higher power levels, both the metered fuel flow rate and the main fuel pump delivery rate are considerably higher than those under idle conditions. The high metered fuel flow rate provides adequate total heat capacity in the supplied fuel stream for absorbing all the heat energy generated by the accessory drive 12 and the engine 10 thus allowing closure of the first and second airflow regulating valves 24, 32 improving overall engine efficiency.

Additionally, by redirecting the bypass fuel return flow from the first location 58 to the second location 60 downstream of the first fuel-oil heat exchanger 20 increases the temperature effectiveness of the first fuel-oil heat exchanger 20 which receives only fresh fuel from the fuel tank 34, unmixed with the warmer bypass fuel stream. This flow configuration insures that the maximum cooling capacity of the fresh fuel stream is available to the accessory drive unit 12 through the first oil cooling loop 14 when the engine operates at full or cruising power One final feature of the embodiment of FIG. 1 are oil bypass lines 64, 65 disposed in the oil loops 14, 16 for directing oil around the respective fuel-oil heat exchangers 20, 28. The bypass flows are regulated by control valves 66, 67 which are opened responsive to fuel and oil temperature during periods, such as at idle, wherein the fuel is too hot to absorb additional heat energy, thereby allowing the system to more flexibly accommodate the needs of the various systems.

By placing the fuel-oil heat exchangers 20, 28 upstream of the main fuel pump 44 and the fuel filter 42, the heat management system according to the present invention also reduces or eliminates the need for auxiliary fuel heating to avoid icing up of the fuel filter 42 under extremely cold operating conditions.

Figure 2:
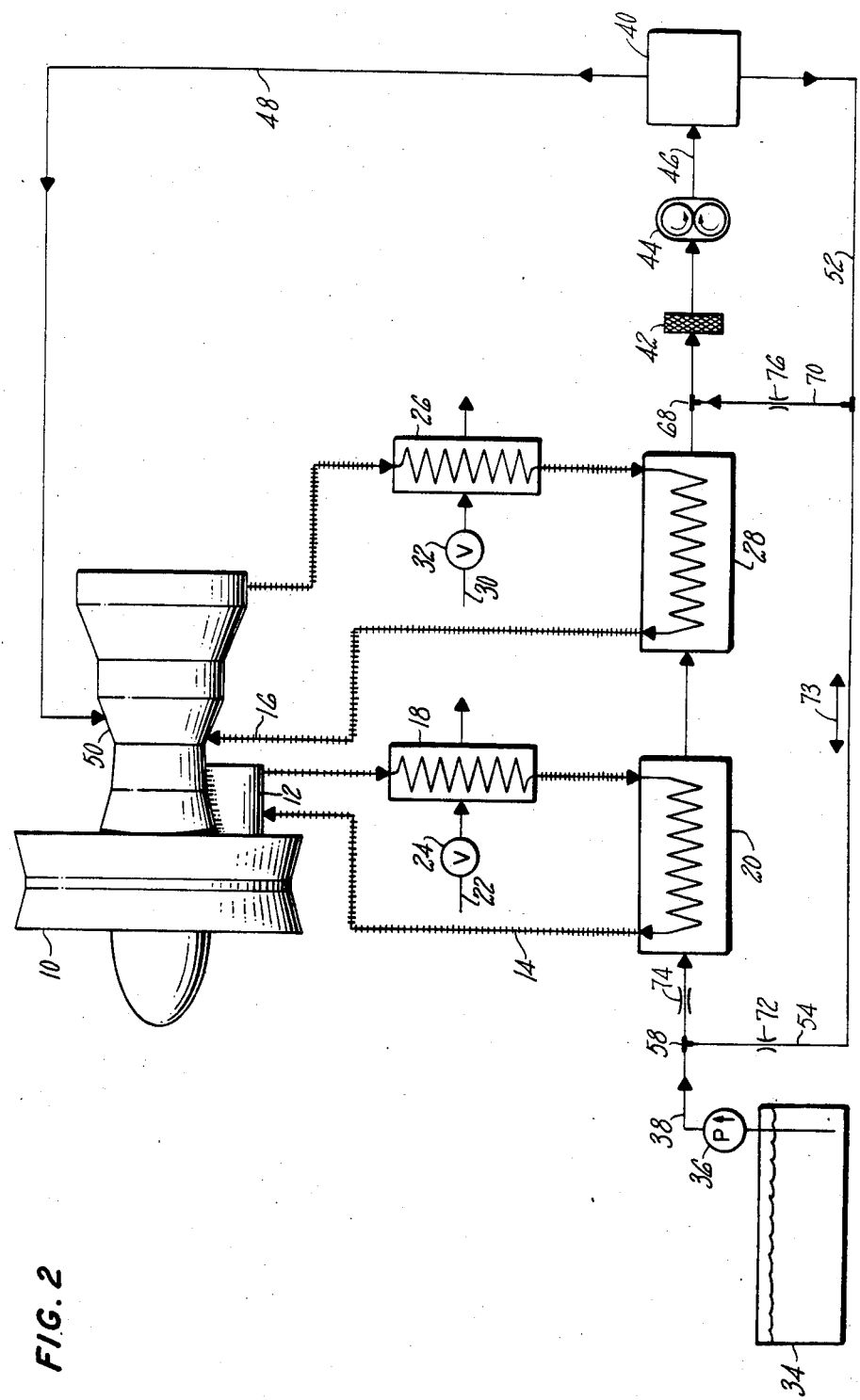
FIG. 2 shows a flow schematic of a second embodiment of a fuel and oil heat management system according to the present invention.

FIG. 2 shows a schematic representation of a second embodiment of the heat management system according to the present invention wherein like reference numerals are used to denote elements in common with the embodiment shown in FIG. 1. The second embodiment according to the present invention distributes the bypass fuel flowing in bypass line 52 between two return locations on the low pressure side of the main fuel pump 44, a first location 58 via a first branch 54, and a third location 68, via a third branch 70. It will be appreciated that the return location and branch denoted by reference numerals 68 and 70, while forming the only other location and branch in the disclosed second embodiment according to the present invention, are termed the third location and third branch to distinguish from the second location and second branch discussed hereinabove with respect to the first embodiment.

The second embodiment uses passive means for allocating the bypass fuel flow between the first and third locations 58, 68 comprising one or more flow restrictors 72, 74, 76, disposed respectively in the first branch 54, the fuel inlet of the first fuel-oil heat exchanger 20, and/or the third branch 70. Based on differential pressures and fuel flow rates at different points in the various fuel lines, the flow restrictors 72, 74, 76 allocate not only the bypass fuel flowing in bypass line 52 between the first location 58 and the second location 68, but may additionally allocate the flow of fresh fuel from the fuel tank 34 between the inlet of the first fuel-oil heat exchanger 20 and the second return location 68 as discussed hereinbelow.

During periods of low power or idle engine operation when the metered fuel flow rate is low, bypass fuel in the bypass line 52 flows into branches 54, 70 and is returned to the supply side of the main fuel pump 44 at return locations 58 and 68. During such periods of operation, sufficient flow of recirculating bypass fuel is present through the first fuel-oil heat exchanger 20 to permit cooling of the fuel by the first oil loop 14 and the first air-oil cooler 18. The exact distribution of the bypass fuel between the first and second locations 58, 68 are determined by the needs of the individual systems, and effected by sizing the flow restrictors 72, 74, 76 appropriately.

During periods of high engine power operation, such as while cruising or during takeoff, fresh fuel supplied from the fuel tank 34 is split at location 58 between the first fuel-oil heat exchanger 20 and the first branch 54. The fresh unmixed fuel bypasses the exchangers 20, 28, joining the bypass fuel in the third branch 70, entering the main fuel pump supply at the third return location 68. The flow restrictors 72, 74, 76 are again used to insure a proper distribution of fresh fuel between the fuel-oil heat exchangers 20, 28 and the first branch 54 according to the heat transfer needs of the joined loops. It should be noted that although the second embodiment is shown in FIG. 2 as utilizing fixed orifice type flow restrictors, it is within the scope of the present invention to utilize flow restrictors having different flow coefficients depending on the direction of the fuel flowing therethrough as well as active fuel flow diverter means such as flow control valves or the like.

Since the actual sizing and distribution of the recycle and fresh fuel between the first and third locations 58, 68 is dependent upon the heat transfer needs of the engine 10 and the accessory drive 12 over the entire engine and drive operating envelope, no specific restrictor sizes or flow proportions are disclosed herein. Such parameters would be developed for each individual engine application based on test results, predicted heat generation rates, required operating environments, and the specifications of the individual engine manufacturer.

The second embodiment according to the present invention thus reduces the proportional range of fuel flow rate in both the first fuel-oil heat exchanger 20 and the second fuel-oil heat exchanger 28 by diverting a portion of the fresh fuel from the tank 34 through the first branch 54 and third branch 70. The use of flow restrictors 72, 74, 76 to effect the reversing flow 73 in the first branch 54 provides a passive means for allocating the flow of both fresh and bypass fuel between the first and third return locations 58, 68 over the range of engine operation.

As discussed above with respect to the first embodiment, the higher metered fuel flow rate present at normal engine power levels is more than sufficient to cool the accessory drive 12 and the engine 10 without the need for diverting cooling air 22, 30 from the engine fan or compressor sections and thereby avoiding any loss of efficiency resulting therefrom. It will be appreciated, however, that the cooling air regulating valves 24, 32 may be controlled responsive to the fuel and/or oil temperatures in the respective loops 14, 16 as necessary to optimize system performance over the entire range of engine operation.

The present invention thus provides a heat management system for benefically distributing fuel in the fuel supply system of a gas turbine engine among various locations with respect to first and second fuel-oil heat exchangers disposed in a heat transfer relationship with the fresh and bypass fuel streams for the purpose of maximizing the internal heat transfer between the circulating cooling oil and the fuel. The foregoing discussion, while attempting to disclose the invention in broad terms commensurate with the scope thereof, nonetheless has been directed to an explanation of only two embodiments thereof and should therefore not be interpreted as limiting, but rather as an illustration of what applicants believe is the best mode for carrying out the invention.

We claim:

1. A system for transferring heat energy among a heat generating gas turbine engine, a heat generating accessory drive coupled to the gas turbine engine, a stream of fuel flowing at a metered flow rate, and a stream of cooling air, comprising:

a first oil circulation loop wherein a first flow of oil circulates through the accessory drive, a first air-oil cooler having a first, regulated portion of the cooling air stream also passing therethrough, and a first fuel-oil heat exchanger;

a second oil circulation loop wherein a second flow of oil circulates through the gas turbine engine, a second air-oil cooler having a second, regulated portion of the cooling air stream also passing therethrough, and a second fuel-oil heat exchanger;

means for conducting at least a portion of the metered fuel stream, in sequence, through the first fuel-oil heat exchanger, the second fuel-oil heat exchanger, and a main fuel pump, the main fuel pump operating at a fuel delivery rate in excess of the metered fuel flow rate;

a fuel controller for receiving the fuel flowing from the main fuel pump and dividing the received fuel between a supply stream having a flow rate equal to the metered flow rate, and a bypass stream having a flow rate equal to the excess of the main pump delivery rate over the metered flow rate; and means, in fluid communication with the fuel controller and the conducting means, for returning the bypass fuel stream into the fuel conducting means upstream of the main fuel pump at a plurality of distinct locations.

2. The system for transferring heat energy as recited in claim 1, further comprising means, responsive to an operating parameter of the gas turbine engine, for apportioning the bypass flow stream among each of the distinct locations in the fuel conducting means.

3. The system for transferring heat energy as recited in claim 1, wherein the plurality of distinct locations includes
   a first location disposed upstream of the first fuel-oil heat exchanger, and
   a second location disposed intermediate the first and second fuel-oil heat exchangers.

4. The system for transferring heat energy as recited in claim 2, wherein the apportioning means comprises
   a diverter valve for actively directing the bypass fuel stream among the plurality of distinct locations.

5. The system for transferring heat energy as recited in claim 2, wherein the plurality of distinct locations includes
   a first location disposed upstream of the first fuel-oil heat exchanger, and
   a second location disposed intermediate the second fuel-oil heat exchanger and the main fuel pump.

6. The system for transferring heat energy as recited in claim 5, wherein the apportioning means includes
   a flow restrictor disposed in the returning means intermediate the first and second locations.

7. The system for transferring heat energy as recited in claim 6, wherein
   the flow restrictor disposed in the returning means intermediate the first and second locations further provides a different coefficient of fluid flow dependent upon the direction of fuel flowing therethrough.

* * * * *